(12) United States Patent
Boehl et al.

(10) Patent No.: US 8,973,006 B2
(45) Date of Patent: Mar. 3, 2015

(54) CIRCUIT ARRANGEMENT FOR EXECUTION PLANNING IN A DATA PROCESSING SYSTEM

(75) Inventors: Eberhard Boehl, Reutlingen (DE); Ruben Bartholomae, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 270 days.

(21) Appl. No.: 13/609,795

(22) Filed: Sep. 11, 2012

(65) Prior Publication Data

US 2013/0081041 A1 Mar. 28, 2013

(30) Foreign Application Priority Data

Sep. 27, 2011 (DE) .......................... 10 2011 083 468

(51) Int. Cl.
*G06F 9/48* (2006.01)
*G06F 9/50* (2006.01)

(52) U.S. Cl.
CPC ........ *G06F 9/4881* (2013.01); *G06F 2209/486* (2013.01)
USPC ............ 718/102; 718/103; 718/104; 712/220

(58) Field of Classification Search
None
See application file for complete search history.

(56) References Cited

U.S. PATENT DOCUMENTS

| 2013/0091505 A1* | 4/2013 | Yu et al. | 718/103 |
| 2013/0104141 A1* | 4/2013 | Boehl et al. | 718/104 |

* cited by examiner

*Primary Examiner* — Qing Wu
(74) *Attorney, Agent, or Firm* — Kenyon & Kenyon LLP (57) ABSTRACT

A circuit arrangement and method for a data processing system for executing a plurality of tasks with a central processing unit having a processing capacity allocated to the processing unit; the circuit arrangement being configured to allocate the processing unit to the specific tasks in a time-staggered manner for processing, so that the tasks are processed in an order to be selected and tasks not having a current processing request are skipped over in the order during the processing; the circuit arrangement including a prioritization order control unit to determine the order in which the tasks are executed; and in response to each selection of a task for processing, the order of the tasks being redetermined and the selection being controlled so that for a number N of tasks, a maximum of N time units elapse until an active task is once more allocated processing capacity by the processing unit.

16 Claims, 3 Drawing Sheets

Fig. 3

# CIRCUIT ARRANGEMENT FOR EXECUTION PLANNING IN A DATA PROCESSING SYSTEM

RELATED APPLICATION INFORMATION

The present application claims priority to and the benefit of German patent application no. 10 2011 083 468.0, which was filed in Germany on Sep. 27, 2011, the disclosure of which is incorporated herein by reference.

FIELD OF THE INVENTION

The present invention relates to a circuit arrangement for a data processing system for executing a plurality of tasks, using a central processing unit, as well as a corresponding method for executing a plurality of tasks in a data processing system.

BACKGROUND INFORMATION

In data processing systems, such as in computer microprocessor systems, control units, peripheral units, as well as in other information processing systems, so-called CPU's (central processing unit) are often used as central processing units of a computer for the purpose of calculation, but simple arithmetic logic units (ALU) may also just be used. In addition, corresponding memories, such as RAM, ROM, EPROM, EEPROM, etc., are used for storing programs and data. The processor or the CPU executes a program or runs a program. In this context, the program is made up, as a rule, of different partial programs, which, in turn, may be dedicated to different tasks. This is referred to as multitasking.

Depending on a current scenario, that is, which tasks require processing at this moment, it is thereby decided which task should be executed by the CPU. In this context, it is conceivable for different tasks to be assigned different priorities, so that during the execution of the tasks, the priority assigned to the specific tasks is taken into account and, accordingly, the task of highest priority is processed first. This is achieved, for example, using so-called interrupts. An interrupt is a short-term interruption of a program, in order to carry out other higher-priority or time-critical processing of another task. In this context, an interruption request is initially made, whereupon an interruption routine is executed and the task executed up to that point is interrupted; and after the interrupt is terminated, this task is resumed at the point of interruption. This means that as a rule, a current request of a task, which has a higher priority than the task in process at the moment, is thereby processed first, and that the task already in process is interrupted instead. In the process, the interrupt in question causes the CPU to jump into a corresponding program section.

The previously mentioned multitasking may also bring about so-called time sharing, which a plurality of users apparently make use of simultaneously. In general, multitasking refers to the ability of a CPU to execute several tasks concurrently. In so doing, the different processes are always activated in alternating fashion in such short intervals, that an impression of simultaneity is formed.

However, the selection of the priorities to be assigned to individual tasks and the execution time of high-priority tasks may result in the tasks having low priority rarely being executed and, in the extreme case, not at all. This may then be the case, when above-mentioned interrupt requests come virtually continuously, and consequently, in this case, the dependence of a task prioritized low in relation to other tasks cannot be completed in its entirety. In this case, it is necessary to take measures to ensure a so-called worst-case execution time (WCET) and, therefore, a minimum degree of operating capacity of the CPU for each task to be processed.

However, in the past, such guarantees have turned out to be potentially very expensive and, in addition, to be able to limit the performance of the underlying system. Furthermore, an interrupt controller, which additionally must be equipped with a priority control system, is necessary in this case.

It has already been described how, using a cyclical interrogation of all tasks, even those not having requests, it can be decided which task shall be processed. To that end, a circuit arrangement was put forward, which is implemented in a data processing architecture and is configured to suitably assign the tasks to be processed to the processing unit available to the system. In this context, the circuit arrangement ensures that the processing capacity of the processing unit is distributed uniformly to the specific tasks and independently of a requirement of the specific tasks, up to their respective execution, and that the processing unit is allocated to the specific tasks in a time-staggered manner for processing. In this manner, each task is automatically processed within a certain time, in particular, within the above-mentioned worst-case execution time (WCET), irrespective of a previously undertaken prioritization. In this context, the time span between two planning times affected during the execution planning always corresponds to the number of tasks N multiplied by a clock pulse duration $T_{CLK}$, during which each task is processed.

Hereinafter, this variable is also referred to as execution time of a task T.

In addition, a circuit arrangement that implements a modified algorithm for execution planning has already been put forward, where prioritization of so-called active tasks is undertaken. In this context, inactive tasks, which already have no use for the computing capacity of an ALU or a CPU, are not included in the operation planning, which means that on average, the processing is sped up.

However, the cyclical prioritization change thereby taking place during the processing of tasks/data has the disadvantage that the underlying algorithm for operation planning in the processing system, which has several so-called pipeline stages, may result in the execution time T being greater than the above-mentioned product of the number of tasks N and the clock pulse duration $T_{CLK}$.

Therefore, it would be desirable to provide an option of utilizing the available operating capacity of a central processing unit or CPU, such that it is ensured in a simple manner that each task to be processed, which currently requires processing, is processed within a certain time; it further being ensured that a maximum execution time is not exceeded.

SUMMARY OF THE INVENTION

Against this background, a circuit arrangement according to the description herein and a corresponding method having the features of described are provided.

The circuit arrangement provided in accordance with the present invention may be implemented, for example, in a data processing architecture and may appropriately assign tasks currently to be processed to a processing unit, e.g., a CPU or ALU, available to the data processing system. Suitable specific embodiments of the circuit arrangement proposed in accordance with the present invention, as well as of the method proposed in accordance with the present invention, are derived from the respective dependent claims and the description.

The exemplary embodiments and/or exemplary methods of the present invention provide a circuit arrangement for a data processing system, in particular, for a cyclical data processing system, for executing a plurality of tasks, using a central processing unit having a processing capacity allocated to the processing unit. In this context, the circuit arrangement is configured to ensure that the processing unit is allocated to the specific tasks in a time-staggered manner for processing, so that the tasks are processed in an order to be selected and tasks not having a current processing request are skipped over in the order during the processing. In this context, the circuit arrangement of the present invention includes a prioritization order control unit, which is configured to determine the order in which the tasks are to be executed; in response to each current selection of a task for processing, the order of processing the tasks being redetermined and the selection being controlled in such a manner, that for a number N of tasks, a maximum of N time units elapse until an active task is once more allocated processing capacity by the processing unit.

The circuit arrangement provided in accordance with the exemplary embodiments and/or exemplary methods of the present invention includes an algorithm for planning the execution of tasks in cyclical data processing systems; an activity status of all tasks being evaluated, in order to thus produce an acceleration of a corresponding data processing. In addition, the algorithm implemented in the circuit arrangement ensures a maximum execution time of $T=N*T_{CLK}$, so that the worst-case execution time mentioned at the outset is not exceeded in any case.

The circuit arrangement proposed in accordance with the present invention and the method proposed in accordance with the present invention may be implemented in a so-called multichannel sequencer (MCS) of a generic timer module (GTM).

In this context, the multichannel sequencer operates several channels. According to the exemplary embodiments and/or exemplary methods of the present invention, it may be provided that the circuit arrangement be configured to allocate a channel having its own registers to each of the tasks to be processed, and to select the specific registers according to the allocation of the specific task to the processing unit and connect them to the processing unit.

In addition, it may be provided that the circuit arrangement be configured to assign the processing unit to each of the tasks having a current processing request, that is, to each of the so-called active tasks, for, in each instance, a constant time period that is the same for all of the active tasks. In this context, tasks not having a current processing request, that is, tasks that do not currently signal any processing, are referred to as a passive task. In the scope of the present description, active tasks are, in contrast, tasks that make a current processing request and correspondingly signal it, so that they are taken into account during the processing by the processing unit.

Accordingly, the circuit arrangement provided in accordance with the present invention provides that the processing capacity or computing capacity of the processing unit provided in the data processing system, e.g., an ALU or CPU, be distributed uniformly to all active tasks.

According to a further specific embodiment of the circuit arrangement provided in accordance with the present invention, the time period, which is consistently made available to each task, corresponds, in this case, to exactly one clock pulse of the processing unit. In this connection, the circuit arrangement according to the present invention provides a prioritization sequence control unit, with the aid of which the order in which the tasks are to be executed or should be executed is determined. According to the exemplary embodiments and/or exemplary methods of the present invention, this means that in response to each current selection of a task for processing, the prioritization order for the processing of the tasks is redetermined in each instance.

In this context, one specific embodiment of the present invention provides that the order of the tasks to be executed be determined by a list (referred to below as a priority list) including list positions having ascending priority, and that a task currently selected for processing then be put into the list position having the lowest priority. The priority list always has the same length, that is, an equal number of list positions corresponding to the number of tasks. In this context, the last list element denotes the task, which, in the pending execution planning step, is treated as having the highest priority. In this context, the preceding element of the priority list denotes a task, which, in the pending execution planning step, is treated as having the second highest priority, etc.

At the time of a circuit reset of the circuit arrangement, the priority list is initialized so as to have the values:

$$L_{PRIO}[i]=i \text{ for all } i=0\ldots,N-1.$$

According to a further specific embodiment of the circuit arrangement of the present invention, it is provided that the list positions in the list that are assigned to the tasks not having a current processing inquiry remain the same, but rotate among the tasks not having a current processing inquiry in such a manner, that the task without a processing inquiry that has the currently highest priority is then to be assigned the list position having the lowest priority.

In a further specific embodiment, the circuit arrangement is also configured to assign each of the tasks a respective channel having its own registers and to select the specific registers according to the allocation of the specific task to the processing unit and connect them to the processing unit.

In each instance, the processing unit is thereby allocated to each of the tasks having a current processing request, at the latest, after a maximum waiting time, and then, for a constant time period that is the same for all active tasks.

The time period may correspond to a clock pulse of a clock cycle of the processing unit.

According to an embodiment of the circuit arrangement, the defined, maximum waiting time may be formed from the product of the number of tasks and the constant time period (time unit), in which the processing unit is allocated to a specific task for processing and connected to it.

In addition, the circuit arrangement of the present invention may be configured to provide an execution of instructions of the specific registers of the specific channels of the tasks having a current processing request, as active tasks, in a pipeline having several pipeline stages; at the time of execution, the specific registers being switched over into correspondingly clocked pipeline registers of the pipeline, and the pipeline stages being processed concurrently in a time period, but in each instance, for different channels.

In this context, decoding of instructions and instances of memory access for a first active task suitably take place, in each instance, in time periods in which the processing unit is allocated to at least one second active task.

Furthermore, the present invention relates to a method for executing a plurality of tasks in a data processing system, in particular, in a cyclical data processing system, with the aid of a central processing unit having a processing capacity allocated to the processing unit. In this context, it is provided that the processing unit be allocated to the specific tasks in a time-staggered manner for processing, that the tasks be processed in an order to be specified, and that tasks not having a current processing request be skipped over in the order during the processing. In this context, in the order in which the tasks are intended to be executed, a prioritization of the tasks is undertaken, and in response to each selection of a task to be currently processed, the order of processing of the tasks is redetermined; the selection being controlled in such a manner, that for a number N of tasks, a maximum of N time units elapse until an active task is once more allocated processing capacity by the processing unit.

Additional advantages and embodiments of the present invention are derived from the description and the appended figures.

It will be appreciated that the features mentioned above and the features yet to be explained below may be used not only in the combination given in each case, but also in other combinations or individually, without departing from the scope of the present invention.

DETAILED DESCRIPTION

The exemplary embodiments and/or exemplary methods of the present invention are represented schematically in the figures on the basis of specific embodiments, and is schematically described in detail with reference to the figures. In this context, a detailed description of the structure and function is provided.

Figure 1:
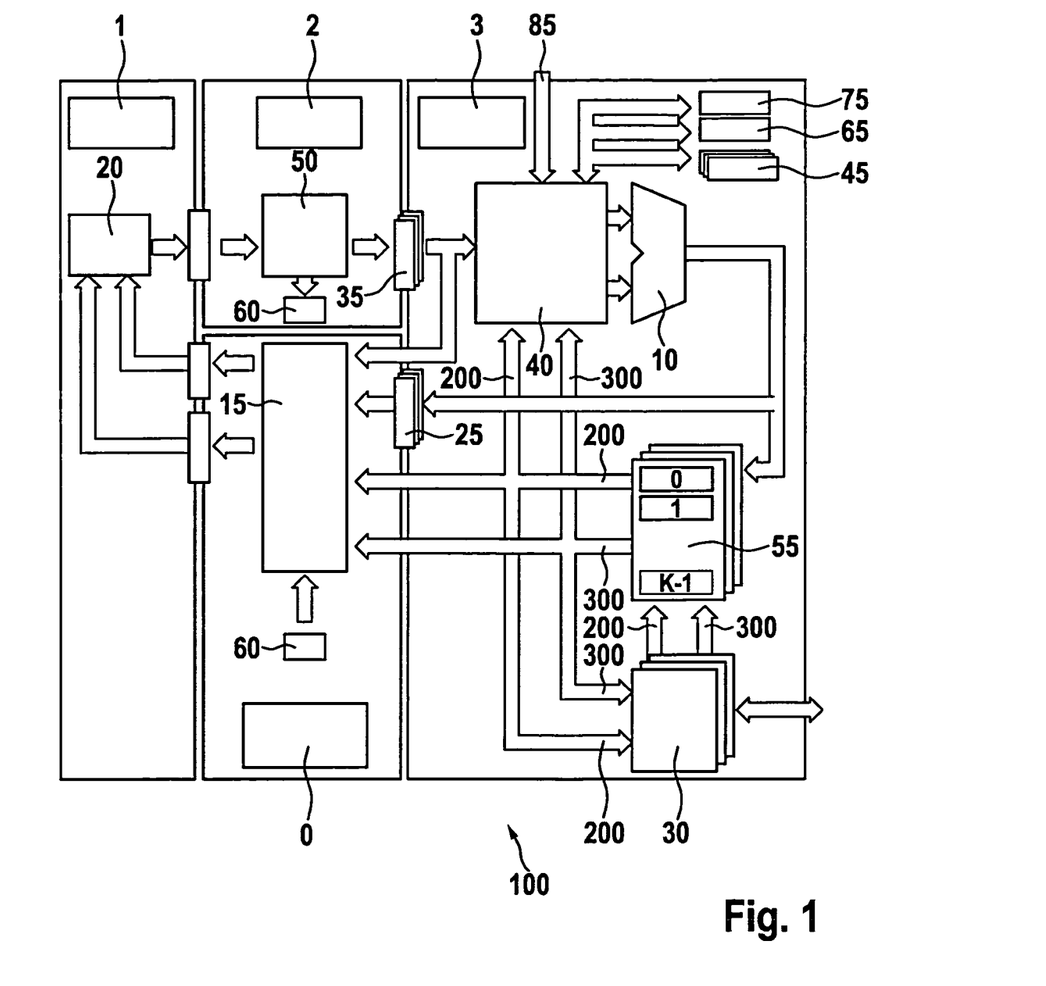
FIG. 1 shows an architecture model, in which the method proposed in accordance with the present invention may be executed.

The method proposed in accordance with the present invention and the circuit arrangement of the present invention may be implemented, for example, in a so-called multichannel sequencer (MCS) of a generic timer module (GTM), a possible architecture of such a multichannel sequencer being represented in FIG. 1.

The multichannel sequencer (MCS) 100 represented here operates a plurality of channels, e.g., 8 or 16, which corresponds to the tasks to be processed. This means that each task to be processed is assigned a channel. MCS 100 has a central processing unit 10, such as an ALU, and a memory 20, such as a RAM. In the case represented here, N channels are operated on the part of the MCS, each channel possessing a separate microprogram, which is stored in different locations of the memory. To execute this program, each channel possesses a separate instruction register (IR) 35, a separate instruction counter (PC) 25, a separate status register (STA) 45 and a separate, so-called general purpose register (GPR) 55, which are designated by 0 . . . K−1 in the present representation.

This means that in the MCS architecture represented here, N instruction registers (N*IR) 35, N instruction counters (N*PC) 25, and N status registers (N*STA) 45 are illustrated. In addition, each channel possesses a separate interface 30, such as an ARU interface, via which data in the specific GRP's 55 may be asynchronously updated, i.e., without waiting for the processing of a corresponding channel, or via which data may be output.

The plurality of existing interfaces 30, which corresponds to the number of channels, is made clear by an indicated "superimposing" of the symbols respectively representing the interfaces. The same applies to the plurality of instruction registers 35, instruction counters 25, general purpose registers 55, and status registers 45 and ABC registers 65.

For synchronization purposes, processing of a channel is blocked, which means that an operation to be carried out and, consequently, a further program execution of the corresponding channel only takes place, when requested data have been received or collected via the specific ARP interface 30 assigned to the corresponding channel. In addition, the architecture represented here provides that an ARU interface 30 of a channel be completed, in each instance, by a separate control bit register (ACB) 65. These control bits are transmitted with the data of the GPR's 55 to ARU interface 30 or are updated by each ARU read instruction. The blocking state of a channel is signaled by setting a corresponding bit (e.g., in status register (STA) 45). All of the other channels continue to execute their program. The lifting of a blocking instruction is induced asynchronously (that is, regardless of if the channel is in the pipeline) via ARU interface 30, as soon as data of general purpose register 55 have been received or transmitted.

In the architecture represented here, all of the channels operated by MCS 100 use the same central arithmetic logic unit 10 (ALU), the same instruction decoder 40, the same instruction pre-decoder 50, the same memory 20 and the same address decoder 15 for memory 20, as illustrated in FIG. 1. In the MCS architecture 100 represented here, a host CPU intervenes in the execution through a host CPU interface 60, via memory 20 (RAM), i.e., data are transferred in a cycle reserved for them, from or to hand shake interface 60 of the host CPU.

Figure 2:
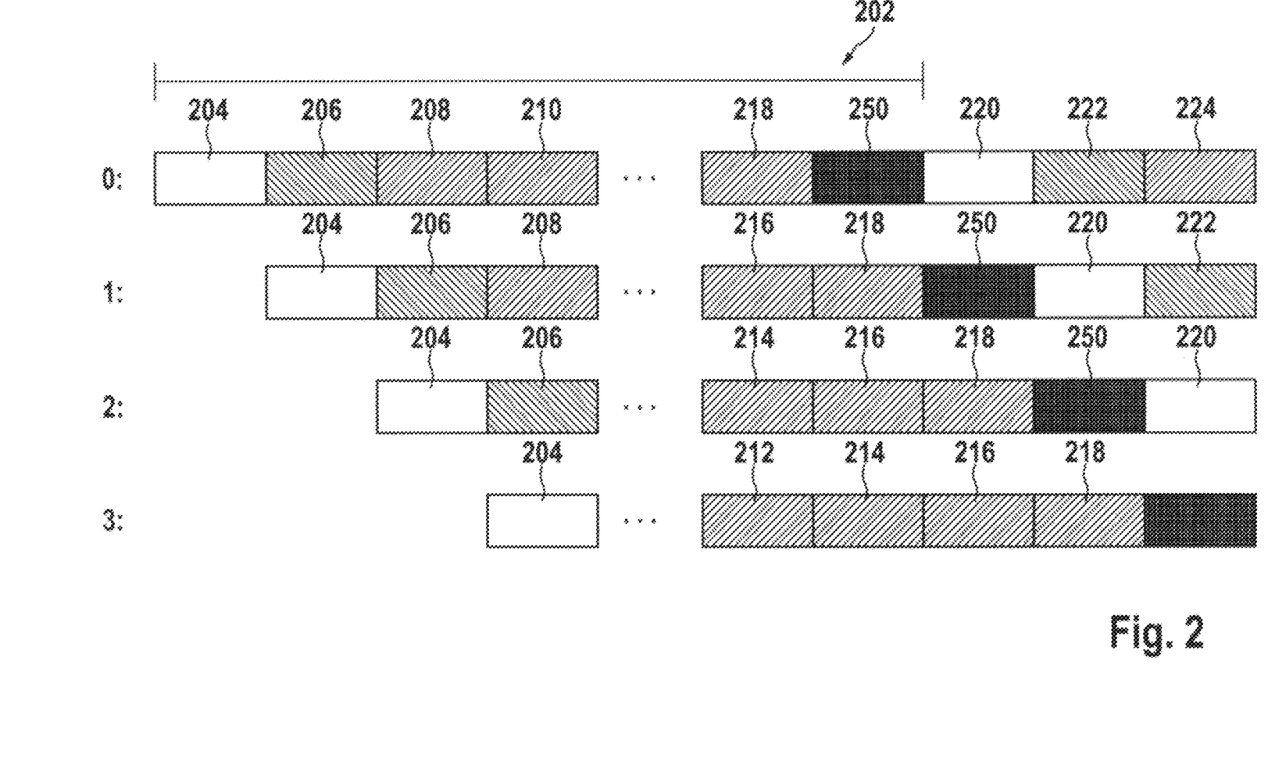
FIG. 2 shows a possible specific embodiment of an instance of pipelining, according to which instruction processing according to the method proposed by the present invention may be undertaken.

According to a possible specific embodiment of the circuit arrangement provided by the present invention, processing of instructions/tasks is undertaken in a pipeline having a plurality of pipeline stages. In this context, four pipeline stages may be classified. The pipeline or instruction pipeline denotes a type of assembly line, with the aid of which the execution of instructions is broken down into partial instructions according to the number of pipeline stages; the pipeline stages for several channels (i.e., tasks) being able to be carried out concurrently, but in each instance, for a different channel (see FIG. 2). This means that instead of a task being completely executed during a processing cycle of the processing unit, in each instance, only a partial task is executed; in this instance, however, different partial tasks of several tasks being executed simultaneously. In this context, the pipeline stages may be:

Stage 0: RAM access decoding
Stage 1: RAM access
Stage 2: instruction pre-decoding
Stage 3: instruction execution.

In stage 0, addresses and control signals for the RAM access pending in the next pipeline stage are initially formed. A RAM access may be the reading of a piece of data or of an instruction, or the writing of a piece of data. In the case of the reading of an instruction, the address is generated from the respective instruction counter (PC). In each of FIGS. 1 and 2, stage 0 is represented by reference numeral 0.

Then, in stage 1, main memory 20 (RAM) is accessed, the corresponding instruction being loaded from main memory 20. In each of FIGS. 1 and 2, stage 1 is represented by reference numeral 1.

Then, in stage 2, an instruction pre-decoding is carried out with the aid of instruction pre-decoder 50. In each of FIGS. 1 and 2, stage 2 is represented by reference numeral 2.

Finally, in stage 3, the instruction execution takes place, which is carried out for all of the tasks by one and the same processing unit 10, for instance, an ALU. In each of FIGS. 1 and 2, stage 3 is represented by reference numeral 3.

All of the pipeline stages are processed concurrently, but in each instance, for a different channel or a task assigned to the corresponding channel. However, in accordance with the circuit arrangement proposed here, the processing only takes place for active tasks or active channels associated with them. The type of temporal execution is represented in FIG. 2 with the aid of a so-called pipeline flow. If channel $C_a$ 204 initially begins with the decoding of the RAM address (stage 0), then, in the next clock pulse, channel $C_a$ carries out the RAM access (stage 1), while channel $C_b$ 206 is occupied with the decoding of the RAM address (stage 0). The corresponding "separate" registers N*PC and N*IR, which are represented in FIG. 1 by 25 and 35, respectively, are automatically switched in as a function of the channel. In stage 3, instructions that only require one processing cycle of execution time process operands 200 and, optionally, 300 from the separate registers or the direct operands from the instruction word and write the result back into the corresponding registers. A further processing cycle is needed for writing data back into memory 20 (RAM). To this end, a bit, which effects the writing-back in the next instruction cycle, is set in status register STA 45 of the corresponding channel. This means that when the corresponding channel is processed again in stage 0, the corresponding RAM address is decoded and, in stage 1, the data are then written from corresponding general purpose register (GPR) 55 into memory 20 (RAM). The situation is similar with the operands from memory 20 (RAM). An entire pipeline sequence is required in order to load data from memory 20 (RAM) into corresponding GPR register 55. Then, this operand may only be processed during the next processing cycle. For instructions that require several processing cycles, it should be taken into account that the corresponding task or the corresponding channel remains active, that is, a corresponding request signal RDYi remains set until the instruction is completely executed.

A special register TRG 75 provides the option of triggering channels among one another. Using time- or position-based signals (TBU: time base unit) 85, the channels themselves may shift an event into a current time reference or control it as a function of positions. This comparison is carried out in processing unit 10, e.g., an ALU, in which, e.g., the TBU (time base unit, not shown here) may provide an operand 85. Access to data of the specific interface 30, for example, an ARU interface, is expected by the corresponding channel, and the blocking reading ensures that data inconsistency cannot occur.

Instruction pre-decoder 50 allows a piece of data from memory 20 (RAM) to be provided in the next operating cycle. To that end, a piece of RAM data is converted to an instruction, which writes the piece of data into the required target register. In addition, instruction pre-decoder 50 ensures that in response to activated blocking instructions (the corresponding bit in the control register is set), the subsequent instructions from the preceding pipeline stages are disregarded. While a blocking instruction is still active, the subsequent instruction is already processed in pipeline stages 0 and 1 and transferred out of the RAM, and in pipeline stage 2, it is decided if, in subsequent pipeline stage 3, the instruction is now processed (if the blocking instruction was asynchronously terminated via the ARU interface) or disregarded (if the blocking instruction is still active). According to the method provided in accordance with the present invention and the circuit arrangement provided in accordance with the present invention, the channel, i.e., the task, which, in each instance, shall be processed next within the scope of a processing cycle, is initially ascertained. For determining the channel to be processed next, that is, the channel, which is inserted into pipeline stage 0 in the next clock cycle, the method of the present invention provides an algorithm, which carries out execution planning with the aid of a list, a so-called priority list $L_{PRIO}$. The execution planning is subsequently discussed in further detail in FIG. 3.

Priority list $L_{PRIO}$ always has the same length, that is, the same number of list positions corresponding to the number of tasks to be processed N.

In this priority list, each element includes a unique assignment to a task by an identification number (ID), and the order in this list determines the priority with which this task is executed. Each identification number occurs exactly once in this list.

The list positions of the priority list are referenced using $L_{PRIO}[i]$ ($i=0,\ldots,N-1$). In this context, the last list element $L_{PRIO}[N-1]$ designates the task, which is treated as having the highest priority in the pending execution planning step. In this context, the preceding element $L_{PRIO}[N-2]$ denotes the task, which is treated as having the second highest priority in the pending execution planning step, etc. At the time of a circuit reset, the list is initialized to have the values:

$$L_{PRIO}[i]=i \text{ for all } i=0,\ldots,N-1.$$

Channel s, which is inserted into pipeline stage 0, i.e., whose task assigned to him is processed next, is now ascertained within one clock cycle.

```
FOR i = N-1 DOWN TO 0 LOOP
    IF is_active(L_PRIO[i]) AND not_in_pipe(L_PRIO[i]) THEN
        s := L_PRIO[i]
        EXIT
    END
END
```

In this context, the function is_active(x) going in is true, if channel x is an active channel which is ready to use the computing capacity of the ALU. In order to indicate this active state, each active task i outputs a request signal (RDYi).

The function not_in_pipe(x) also going in is true, if, in the next clock pulse, channel x is no longer in a pipeline stage, that is, currently no longer being processed and, consequently, in combination with a corresponding request signal, is once more available for processing.

In order to simplify an implementation of the MCS hardware, a channel may never be active more than one time in a pipeline stage.

In addition, according to the exemplary embodiments and/or exemplary methods of the present invention, the priority list $L_{PRIO}[i]$ is also updated within each clock cycle, directly after the ascertaining of s, as follows:

```
IF s = L_PRIO[N-1] THEN
    L_PRIO[i] := L_PRIO[i-1] for all i = 1... N-1
    L_PRIO[0] := s
ELSE IF s = L_PRIO[0] THEN
    L_PRIO[i] := L_PRIO[i-1] for all i = 2... N-1
    L_PRIO[1] := L_PRIO[N-1]
    L_PRIO[0] := s
ELSE
    f := 0
        FOR i = N-1 DOWN TO 2 LOOP
            IF L_PRIO[i-1] = s THEN
                f := 1
```

```
        END
    IF f = 1 THEN
        L_PRIO[i] := L_PRIO[i-2]
    ELSE
        L_PRIO[i] := L_PRIO[i-1]
    END
END
L_PRIO[1] := L_PRIO[N-1]
L_PRIO[0] := s
END
```

If each task is at list position $L_{PRIO}[N-1]$ (position having the highest priority) once after, at the latest, N clock pulses, then a maximum execution time of T≤N clock pulses (worst case execution time) is generated for all active channels x having a true is_active(x), when the processing time for each task is one clock pulse. The above algorithm ensures this requirement, since all of the list elements, i.e., all of the tasks, are shifted by at least one position in each clock pulse and, at each instant, all of the tasks are contained in the list.

In this context, it is provided that the specific task only be processed, when the task itself is to be regarded as an active task, as described above. This means that tasks, which do not make a request for processing at a current time, that is, do not emit a request signal, are skipped over in the order of tasks during execution. That is, the order that is specified includes all of the tasks to be processed. However, during the execution of the tasks, in the order, attention is paid to whether or not the specific task, which is pending according to the order, is also to be regarded as an active task, that is, whether or not this task has currently emitted a request signal.

Each active task i and, in connection with that, each active channel i, whose request signal is consequently set to 1, i.e., RDYi=1, is always processed for exactly one clock pulse of the processing cycle or another comparable processing time. In addition, it may be provided that the CPU also control a so-called reserved task, that is, at least one additional channel is reserved for this. In this context, the writing or reading of the RAM or memory 20 is regarded as an additional channel. Since this memory 20 is advantageously implemented as a single port RAM (for the purpose of reducing the amount of hardware in comparison with a dual port RAM), writing or reading of RAM 20 by a host CPU via host CPU interface 60 would possibly lead to conflicts, if another process simultaneously needs access to RAM 20. In this context, this other process may be the completion of the program for a channel currently being processed. If an additional channel is reserved for host CPU 60, then only the host CPU receives access to RAM 20 via host CPU interface 60 in corresponding time period 250 (see FIG. 2). In this context, it may also be provided that possible interrupt requests be addressed via this additional channel, if this request is in connection with the writing or reading of RAM 20.

FIG. 2 illustrates once more the parallel processing of pipeline stages in the case of N channels. In the case illustrated here, the pipeline includes 4 pipeline stages, represented as stage 0, stage 1, stage 2 and stage 3. One processing cycle 202 corresponds to, for example, N+1 clock pulses. After a start-up phase, in each clock pulse, exactly one channel is assigned to one pipeline stage and correspondingly processed. Therefore, the pipeline stages are processed concurrently, but in each instance, for a different channel. As already mentioned, the CPU is allocated at least one additional time slot 250, which means that processing cycle 202 includes N+1 clock pulses.

FIG. 2 shows in detail that in the first pipeline stage, a channel $C_a$ 204, a channel $C_b$ 206, a channel $C_c$ 208, a channel $C_d$ 210, etc. are processed or executed one after the other during a first processing cycle 202. The processing or execution of a channel $C_k$ 218, which represents the Nth active channel, occurs last during first processing cycle 202. Last time slot 250 of processing cycle 202 is reserved for the CPU, i.e., for the channel reserved for the CPU. A channel $C_x$ 220, a channel $C_y$ 222, a channel $C_z$ 224, etc. are processed in a subsequent processing cycle, it always being a question of currently active channels.

For the further pipeline stages, stage 1, stage 2, stage 3, processing of each active channel begins, in each instance, offset by one clock pulse.

In this connection, according to FIG. 2, it is provided that for the first pipeline stage, stage 1, channel $C_a$ 204, channel $C_b$ 206, channel $C_c$ 208, etc., be processed or executed during first processing cycle 202. At the end of processing cycle 202, channel $C_j$ 216 and channel $C_k$ 218 are processed. In the following processing cycle, the CPU is initially provided a time slot 250, and subsequently, channel $C_x$ 220, channel $C_y$ 222, etc. are executed.

For second pipeline stage 2, during first processing cycle 202, channel $C_a$ 204 and channel $C_b$ 206 are initially executed or processed, likewise offset by one clock pulse. At the end of the processing cycle, channel $C_i$ 214 and channel $C_j$ 216 are processed. In the next processing cycle, channel $C_k$ 218 is initially processed, time slot 250 is made available for the CPU, and then channel $C_z$, etc. are processed.

For third pipeline stage 3, channel $C_a$ 204, etc., are processed during first processing cycle 202. At the end of first processing cycle 202, a channel $C_h$ 212 and channel $C_i$ 214 are processed or executed. In the next processing cycle, channel $C_j$ 216 and channel $C_k$ 218 are initially processed.

In summary, this means that according to the exemplary representation in FIG. 2, after a start-up phase, e.g., N active tasks are processed and additionally, a time slot for a host CPU, i.e., for a channel reserved for the host CPU, is provided in each processing cycle, which means that each processing cycle includes N+1 clock pulses. The individual, active tasks are each processed in all 4 pipeline stages; this taking place in a time-staggered manner for an individual, active task, here in FIG. 2, offset by one clock pulse. The " . . . " illustrated in FIG. 2 refer to all active tasks, which are processed in processing cycle 202 without being explicitly named.

Figure 3:
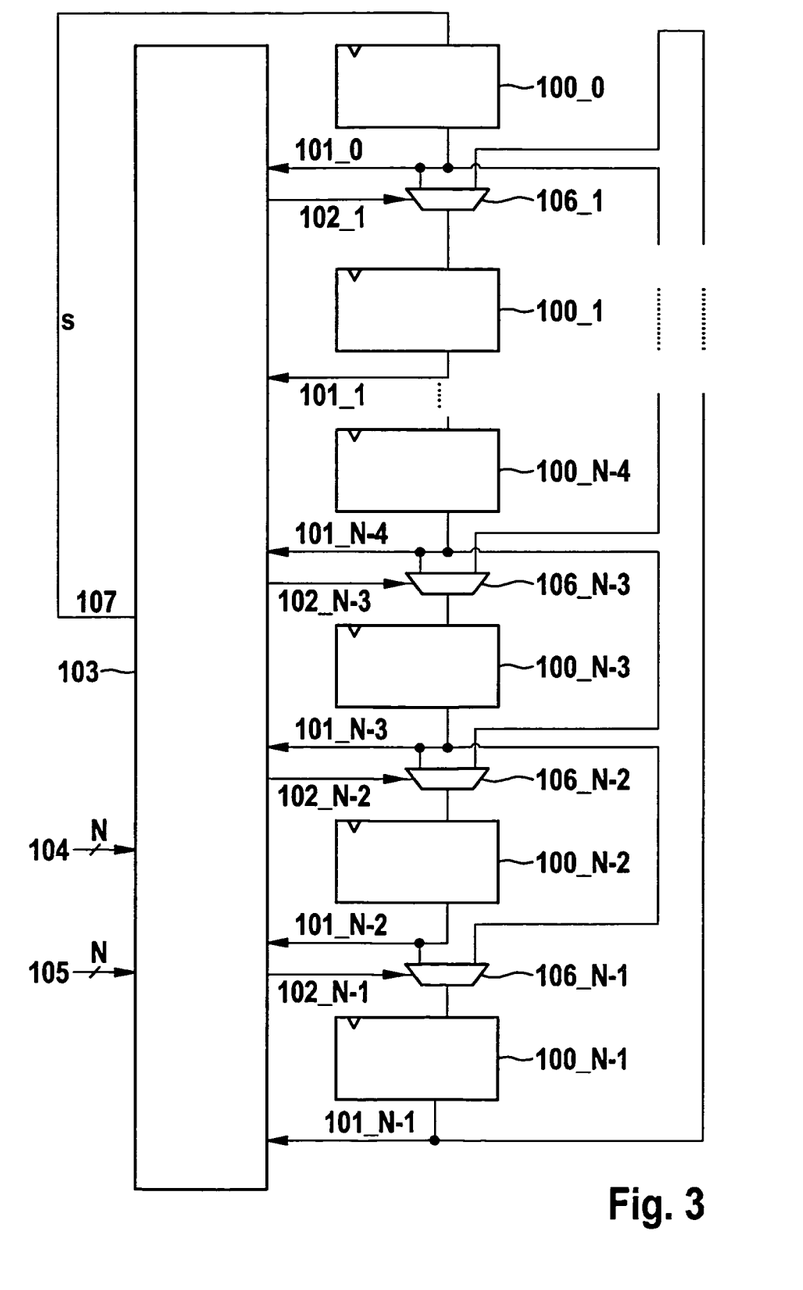
FIG. 3 shows a schematic representation of a specific embodiment of a circuit arrangement according to the present invention.

FIG. 3 shows a circuit arrangement, which is made up of N registers 100_0 to 100_N−1 and a combinational circuit 103. Registers 100_0 through 100_N−1 are used for storing the list elements of the priority list $L_{PRIO}[i]$ (i=0, . . . , N−1), and the combinational circuit is used for selecting the task s (or a correspondingly assigned channel s), which shall be processed next in the scope of a processing cycle. For determining the channel to be processed next, that is, the channel, which is inserted into pipeline stage 0 in the next clock cycle, the method of the present invention provides the above-described algorithm, which carries out execution planning with the aid of priority list $L_{PRIO}$. Registers 100_0, . . . , 100_N−1 of the priority list are referenced with $L_{PRIO}[i]$ (i=0, . . . , N−1), the number of tasks being N. In this context, the last list element 100_N−1=$L_{PRIO}$[N−1] designates the task, which is treated as having the highest priority in the pending execution planning step. In this context, preceding register 100_N−2=$L_{PRIO}$[N−2] denotes the task, which is treated as having the second highest priority in the pending execution planning step, etc. At the time of a circuit reset, registers 100_0 through 100_N−1 are initialized to have the values:

$$L_{PRIO}[i] = i \text{ for all } i = 0, \ldots, N-1.$$

Channel s, which is inserted into pipeline stage 0, i.e., whose task assigned to him is processed next, is now ascertained or selected within one clock cycle. To this end, the algorithm implemented in combinational circuit 103 evaluates the registers, using the illustrated input signals 101_0 through 101_N-1; the function "is_active" being implemented by evaluating the N input signals 104, and the function "not_in_pipe" being implemented by evaluating input signals 105. Function "is_active" indicates if a task currently considered s is active, i.e., if the channel assigned to it is ready to use computing capacity of the ALU. Function "not_in_pipe" checks if task s is no longer in a pipeline stage in the next clock pulse. The information for calculating the functions "is_active" and "not_in_pipe" may be provided, for example (as shown), by N individual signals 104 and 105, respectively. In this case, an individual binary signal describes the state of an individual, predetermined channel. Registers 101_0 through 100_N-3 are run through in descending order, and if the two corresponding bits from 104 and 105 of the task currently considered are true, then this task is selected as task s and inserted into the pipeline in the next clock pulse. Concurrently to this, in the next clock pulse, s is inserted into the priority register 100_0 having the lowest priority, via signal 107. In addition, combinational circuit 103 brings control signals 102_1 through 102_N-1 into the desired position using multiplexers 106_1 through 106_N-1, respectively, and indeed, precisely in a manner such that selected channel s is no longer contained in registers 100_1 through 100_N-1. To this end, the channels present in registers 100_0 through 100_N-1 are shifted up in the priority list by one or two list positions. List position $L_{PRIO}[i]$ is then taken by the preceding element/task, which was previously at list position $L_{PRIO}[i-1]$; or, if selected element s was at this list position $L_{PRIO}[i-1]$, or one was already found in the list in the previous iteration, list position $L_{PRIO}[i]$ is taken by the element/task before the preceding element/task, of which the former was previously at list position $L_{PRIO}[i-2]$, which means that each task is available for processing, i.e., holds list position $L_{PRIO}[N-1]$, after, at the latest, N clock pulses.

What is claimed is:

1. A circuit arrangement for a data processing system for executing a plurality of tasks using a central processing unit with a processing capacity, comprising:
   a circuit configured to allocate the processing unit to specific tasks in a time-staggered manner for processing, so that the tasks are processed in an order to be selected and tasks not having a current processing request are skipped over in the order during the processing, wherein:
   the circuit includes a prioritization order control unit configured to determine the order in which the tasks are to be executed;
   in response to each selection of a task for processing, the order of the tasks is redetermined and the selection is controlled so that, for a number N of tasks, a maximum of N time units elapse until an active task is once more allocated processing capacity by the processing unit; and
   at least one of:
   the order of the tasks to be executed is determined by a list including list positions of ascending priority, and a task currently selected for processing is to be put into the list position with the lowest priority;
   the circuit arrangement is configured to assign each of the tasks a respective channel with its own registers, to select the specific registers according to the allocation of the specific task to the processing unit, and to connect the selected registers to the processing unit; and
   the circuit arrangement is configured to allocate the processing unit, in each instance, to each of the tasks for which there is a current processing request, at the latest, after a maximum waiting time, and then, for a constant time period that is the same for all of the active tasks.

2. The circuit arrangement of claim 1, wherein the order of the tasks to be executed is determined by the list including the list positions of ascending priority, and the task currently selected for processing is to be put into the list position with the lowest priority.

3. The circuit arrangement of claim 2, wherein the list positions in the list that are assigned to the tasks not having a current processing inquiry remain the same, but rotate among the tasks not having a current processing inquiry in such a manner, that the task that does not have a processing inquiry and currently has the highest priority is to be assigned the list position having the lowest priority.

4. The circuit arrangement of claim 2, wherein the list is initialized upon a circuit reset.

5. The circuit arrangement of claim 1, wherein the circuit arrangement is configured to assign each of the tasks the respective channel with its own registers, to select the specific registers according to the allocation of the specific task to the processing unit, and to connect the selected registers to the processing unit.

6. The circuit arrangement of claim 5, wherein the circuit arrangement is configured to provide an execution of instructions of the specific registers of the specific channels of the tasks having a current processing request, as active tasks, in a pipeline having several pipeline stages, and wherein at the time of execution, the specific registers are switched over into correspondingly clocked pipeline registers of the pipeline, and the pipeline stages are processed concurrently in a time period, but in each instance, for different channels.

7. The circuit arrangement of claim 6, wherein decoding of instructions and instances of memory access for a first active task take place, in each instance, in time periods in which the processing unit is allocated to at least one second active task.

8. The circuit arrangement of claim 1, wherein the circuit arrangement is configured to allocate the processing unit, in each instance, to each of the tasks for which there is a current processing request, at the latest, after the maximum waiting time, and then, for the constant time period that is the same for all of the active tasks.

9. The circuit arrangement of claim 8, wherein as a time unit, the time period corresponds to a clock pulse of the processing unit.

10. The circuit arrangement of claim 1, wherein the processing unit is one of a central processing unit (CPU) and an arithmetic logic unit (ALU).

11. The circuit arrangement of claim 1, wherein the circuit arrangement is implemented in a multichannel sequencer.

12. A method for executing a plurality of tasks in a data processing system using a central processing unit with a processing capacity, the method comprising:
   allocating the processing unit to specific tasks in a time-staggered manner for processing;
   processing the tasks in an order to be selected, wherein tasks without a current processing request are skipped over in the order during the processing; and
   in response to each selection of a task for processing, redetermining the order of the tasks and controlling the selection so that, for a number N of tasks, a maximum of N time units elapse until an active task is once more allocated processing capacity by the processing unit;

wherein at least one of:
- the order of the tasks to be executed is determined by a list including list positions of ascending priority, and a task currently selected for processing is put into the list position with the lowest priority;
- each of the tasks is assigned a respective channel with its own registers, and the specific registers are selected according to the allocation of the specific task to the processing unit and connected to the processing unit; and
- the processing unit is allocated, in each instance, to each of the tasks for which there is a current processing request, at the latest, after a maximum waiting time, and then, for a constant time period that is the same for all of the active tasks.

13. The method of claim 12, wherein the order of the tasks to be executed is determined by the list including the list positions of ascending priority, and a task currently selected for processing is put into the list position with the lowest priority.

14. The method of claim 12, wherein each of the tasks is assigned the respective channel with its own registers, and the specific registers are selected according to the allocation of the specific task to the processing unit and connected to the processing unit.

15. The method of claim 12, wherein the processing unit is allocated, in each instance, to each of the tasks for which there is a current processing request, at the latest, after the maximum waiting time, and then, for the constant time period that is the same for all of the active tasks.

16. The method of claim 12, the method further comprising:
- evaluating an activity status in order to produce an acceleration of a corresponding data processing.

* * * * *